(12) United States Patent
Johnson

(10) Patent No.: US 11,518,692 B2
(45) Date of Patent: Dec. 6, 2022

(54) ELECTROCOAGULATION SYSTEM

(71) Applicant: Curt Johnson, Casper, WY (US)

(72) Inventor: Curt Johnson, Casper, WY (US)

( * ) Notice: Subject to any disclaimer, the term of this patent is extended or adjusted under 35 U.S.C. 154(b) by 887 days.

(21) Appl. No.: 16/252,443

(22) Filed: Jan. 18, 2019

(65) Prior Publication Data

US 2019/0225512 A1    Jul. 25, 2019

Related U.S. Application Data

(60) Provisional application No. 62/619,682, filed on Jan. 19, 2018.

(51) Int. Cl.
*C02F 1/463* (2006.01)
*C02F 1/461* (2006.01)

(52) U.S. Cl.
CPC .......... *C02F 1/463* (2013.01); *C02F 1/46109* (2013.01); *C02F 2201/009* (2013.01); *C02F 2201/46125* (2013.01)

(58) Field of Classification Search
CPC ...................................................... C02F 1/463
See application file for complete search history.

(56) References Cited

U.S. PATENT DOCUMENTS

| | | | |
|---|---|---|---|
| 5,587,057 A * | 12/1996 | Metzler | B01D 17/06 205/742 |
| 6,139,710 A | 10/2000 | Powell | |
| 7,211,185 B2 | 5/2007 | Powell | |
| 7,981,301 B2 | 7/2011 | Powell | |
| 2002/0036172 A1 * | 3/2002 | Del Signore | C02F 1/463 210/748.17 |
| 2002/0040855 A1 * | 4/2002 | Morkovsky | C02F 1/463 205/742 |
| 2002/0166819 A1 * | 11/2002 | Dutil | B01D 21/01 210/696 |
| 2004/0251213 A1 * | 12/2004 | Bradley | C02F 1/463 205/676 |
| 2005/0274606 A1 | 12/2005 | Powell | |
| 2009/0173638 A1 | 7/2009 | Powell et al. | |
| 2010/0126932 A1 | 5/2010 | Powell | |
| 2011/0155564 A1 * | 6/2011 | Oifman | C02F 1/463 204/230.2 |
| 2011/0308938 A1 * | 12/2011 | Gilmore | C02F 1/463 204/228.6 |
| 2017/0152162 A1 * | 6/2017 | Cam | C02F 1/46109 |

FOREIGN PATENT DOCUMENTS

KR    20110135025 A * 12/2011
WO    WO-2011102464 A1 * 8/2011 ............. B01D 61/10

* cited by examiner

*Primary Examiner* — Salil Jain
(74) *Attorney, Agent, or Firm* — Duft & Bornsen, PC (57) ABSTRACT

An electrocoagulation (EC) unit that performs an electrocoagulation process on wastewater or the like. In one embodiment, the EC unit includes a reaction tank formed from a non-conductive material, charge plates within the reaction tank that are spaced at a distance, intermediate plates disposed within the reaction tank between the charge plates, and plate conductors configured to electrically couple the charge plates to a power source. The bottom of the reaction tank tapers toward one or more ports which act as an ingress and egress point for the EC unit.

20 Claims, 8 Drawing Sheets

ELECTROCOAGULATION SYSTEM

RELATED APPLICATIONS

This non-provisional application claims priority to U.S. provisional application 62/619,682, filed on Jan. 19, 2018, which is incorporated herein by reference as if fully provided herein.

TECHNICAL FIELD

This disclosure is related to the field of water treatment systems, and more particularly, to electrocoagulation (EC) systems.

BACKGROUND

Oil production industries are consistently forced to deal with water challenges that result from drilling processes. During a drilling process, an oil/water mixture is pumped from the ground, which is referred to as production water or wastewater. The wastewater coming from the ground could be 95% water and 5% oil by volume. The wastewater may also include traces of heavy metals and other contaminants. Before the wastewater can be safely disposed of or reused, the contaminants need to be removed. Thus, oil companies have the challenge of removing contaminants and safely disposing of the wastewater. Other companies in other industries face similar problems of having to safely dispose of wastewater.

One common way of treating wastewater is through a reverse osmosis filtering process. Unfortunately, the reverse osmosis filtering process is expensive and can be relatively slow especially when the oil content in the wastewater is high. Another common way of treating the wastewater is through a distillation process, which again is expensive and time consuming. Yet another way of treating the wastewater is through chemical processes, which are expensive and further processes are needed to return the wastewater to a safe level.

Thus, there is a need in the art for improved filtering systems so that wastewater can be safely and reliably processed.

SUMMARY

Embodiments described herein set forth an electrocoagulation (EC) unit for cleaning wastewater or the like. In one embodiment, an EC unit includes a reaction tank formed from a non-conductive material, charge plates within the reaction tank that are spaced at a distance, intermediate plates disposed within the reaction tank between the charge plates, and plate conductors configured to electrically couple the charge plates to a power source. The bottom of the reaction tank tapers toward one or more ports on the bottom of the reaction tank. Due to the tapered bottom, the reaction tank may be completely emptied of liquids when desired, whether it be wastewater, sludge, a cleansing solution, etc.

In another embodiment, a length of the charge plates in a vertical direction is at least twice a width of the charge plates in a horizontal direction.

In another embodiment, a length of the intermediate plates is at least twice a width of the intermediate plates.

In another embodiment, the charge plates are at least twice as thick as the intermediate plates.

In another embodiment, the EC unit further comprises gaps between the charge plates and the intermediate plates, where the gaps are in the range of $\frac{1}{8}^{th}$ inch to $\frac{3}{8}^{th}$ inch.

In another embodiment, the plate conductors and the charge plates connect via electrical couplings, and the electrical couplings are disposed a distance from a top of the charge plates.

In another embodiment, the EC unit further comprises insulators disposed around the plate conductors that extend from the electrical couplings to above a water level of the EC unit.

In another embodiment, the EC unit further comprises a lid configured to cover a top of the reaction tank. The lid includes plate conductor openings that act as passageways for the plate conductors and the insulators.

In another embodiment, the electrical couplings are located at a bottom region of the charge plates.

In another embodiment, the electrical couplings are located at a middle region of the charge plates.

In another embodiment, an individual charge plate of the charge plates, and an individual plate conductor of the plate conductors comprise a monolithic body. The individual charge plate includes a recess its top that extends downward. The individual plate conductor projects out of the top of the individual charge plate from the recess.

In another embodiment, an insulator is disposed around the individual plate conductor from below the top of the individual charge plate to above a water level of the EC unit.

In another embodiment, a bottom section of the reaction tank includes interior surfaces that slope toward and abut the port(s) at bottom ends. The bottom ends of the interior surfaces are flush with the port(s) to form a smooth transition between the interior surfaces and the port(s).

In another embodiment, the reaction tank further comprises a recirculation port through a side wall of the reaction tank. The recirculation port is between a water level of the EC unit and an uppermost plate level of the charge plates and the intermediate plates.

Another embodiment comprises an EC unit that includes a reaction tank formed from a non-conductive material having at least one side wall, at least one port disposed at a bottom of the reaction tank configured to receive a flow of wastewater, and a trough at a top of the reaction tank configured as an exit for the flow of wastewater. The EC unit further includes charge plates spaced at a distance that are disposed vertically within the reaction tank, intermediate plates disposed vertically between the charge plates, and plate conductors configured to electrically couple the charge plates to a power source. A length of the charge plates and the intermediate plates in a vertical direction is at least twice a width of the charge plates and the intermediate plates in a horizontal direction.

In another embodiment, the reaction tank includes an upper section that houses the charge plates and the intermediate plates, and a bottom section that tapers toward the port(s).

In another embodiment, the plate conductors and the charge plates connect via electrical couplings. The electrical couplings are disposed a distance from a top of the charge plates.

In another embodiment, the EC unit further comprises insulators disposed around the plate conductors that extend from the electrical couplings to above a water level of the EC unit.

Another embodiment comprises an EC unit that includes a reaction tank having an upper section and a lower section formed from a non-conductive material, charge plates spaced at a distance within the upper section, intermediate plates disposed between the charge plates within the upper section, and plate conductors that connect to the charge plates via electrical couplings and configured to electrically couple the charge plates to a power source. The electrical couplings are disposed a distance from a top of the charge plates. The EC unit further includes insulators disposed around the plate conductors that extend from the electrical couplings to above a water level of the EC unit.

In another embodiment, the lower section tapers from the upper section to one or more ports on a bottom of the reaction tank to form a funnel shape.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
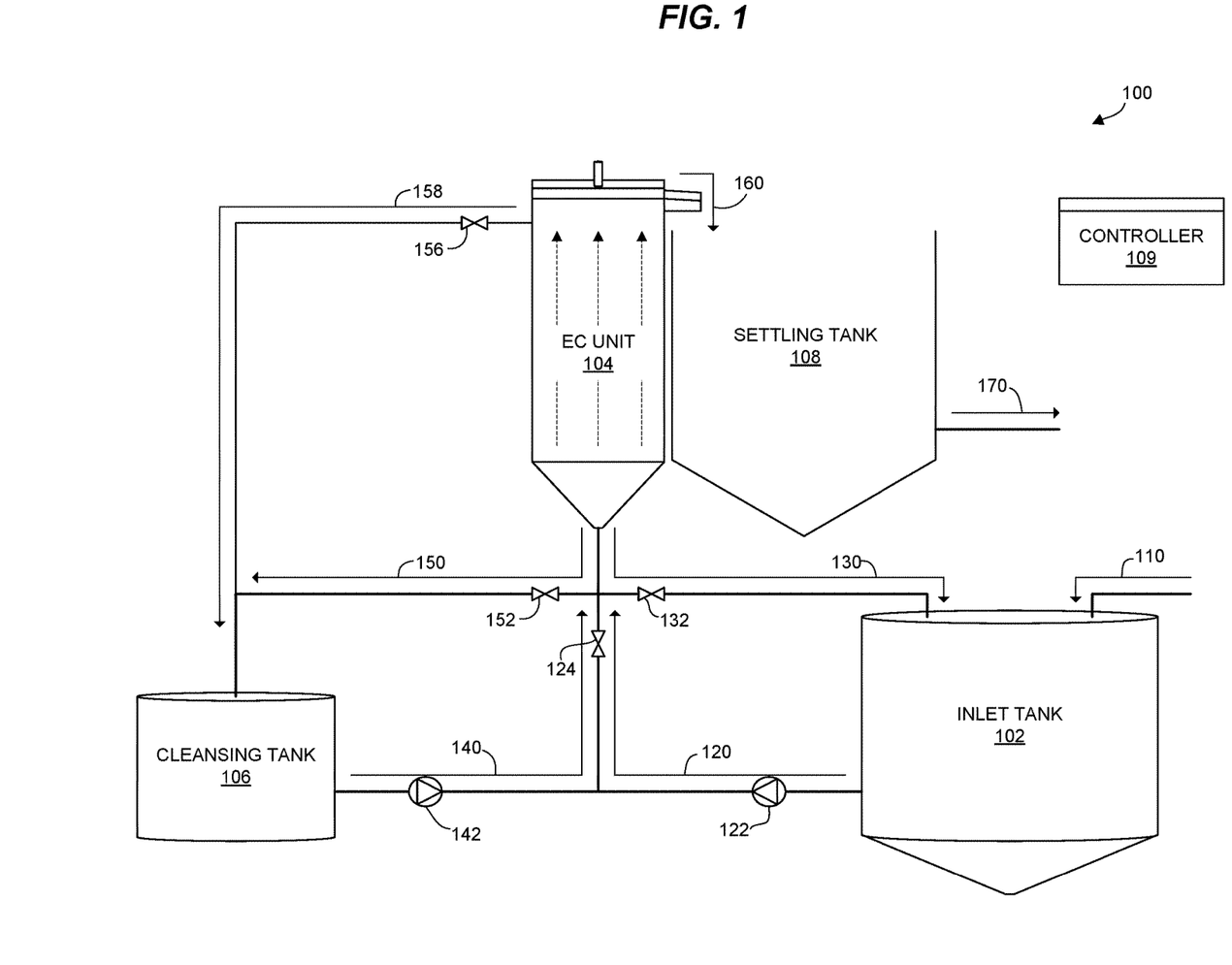
FIG. 1 illustrates a water filtering system in an illustrative embodiment.

FIG. 1 illustrates a water filtering system 100 in an illustrative embodiment. Water filtering system 100 may be used as one of multiple stages for filtering wastewater, which comprises water that includes one or more contaminants. Wastewater may also be referred to as grey water or production water. In one example, wastewater is produced during oil drilling processes.

Water filtering system 100 includes one or more inlet tanks 102, one or more EC units 104, one or more cleansing tanks 106, and one or more settling tanks 108. An inlet tank 102 is a receptacle or storage chamber that stores wastewater to be filtered or purified. An EC unit 104 (also referred to as an EC cell or EC system) comprises a system that uses electrocoagulation to separate suspended particles from a liquid. A cleansing tank 106 comprises a receptacle or storage chamber that stores a cleansing solution for EC unit 104, such as an acid. A settling tank 108 (also referred to as a receiving tank or a clarifier) is a receptacle or storage chamber that stores wastewater after electrocoagulation.

In this embodiment, inlet tank 102 is supplied with wastewater via a supply fluid path 110. Inlet tank 102 is fluidly coupled to EC unit 104 via an inlet fluid path 120. Inlet fluid path 120 may include a pump 122, a valve 124, and piping that connects inlet tank 102, pump 122, valve 124, and EC unit 104. Pump 122 is configured to force wastewater from inlet tank 102 to EC unit 104 via inlet fluid path 120 when valve 124 is open. Inlet tank 102 is also fluidly coupled to EC unit 104 via a drain fluid path 130. Drain fluid path 130 may include a valve 132 and piping that connects EC unit 104, valve 132, and inlet tank 102.

Cleansing tank 106 is fluidly coupled to EC unit 104 via an inlet fluid path 140. Inlet fluid path 140 may include a pump 142, valve 124, and piping that connects cleansing tank 106, pump 142, valve 124, and EC unit 104. Pump 142 is configured to force a cleansing solution (e.g., an acid) from cleansing tank 106 to EC unit 104 via inlet fluid path 140 when valve 124 is open. Cleansing tank 106 is also fluidly coupled to EC unit 104 via a drain fluid path 150. Drain fluid path 150 may include a valve 152 and piping that connects EC unit 104, valve 152, and cleansing tank 106. Cleansing tank 106 is also fluidly coupled to EC unit 104 via a recirculation fluid path 158. Recirculation fluid path 158 may include a valve 156 and piping that connects EC unit 104, valve 156, and cleansing tank 106.

Settling tank 108 is disposed near an outlet of EC unit 104, and is fluidly coupled to EC unit 104 via an outlet fluid path 160. As described in more detail below, wastewater may be gravity fed from the outlet at or near the top of EC unit 104 to settling tank 108 via outlet fluid path 160. Clean or purified water may be released from settling tank 108 via outlet path 170.

Water filtering system 100 may further include a controller 109 configured to provide automated and/or computerized control of water filtering system 100. Controller 109 is configured to regulate the opening and closing of various valves 124, 132, 152, and 156 throughout water filtering system 100, to control pumps 122 and 142, to control power to various components, such as EC unit 104, etc. Controller 109 may include one or more processors that are communicatively coupled to a memory. While the specific hardware implementation of controller 109 is subject to design choices to perform the functionality described herein, the processor may comprise any electronic circuits and/or optical circuits that are able to perform functions. The processor may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc. The memory comprises any electronic circuits, and/or optical circuits, and/or magnetic circuits that are able to store data. The memory may include one or more volatile or non-volatile Dynamic Random-Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 2:
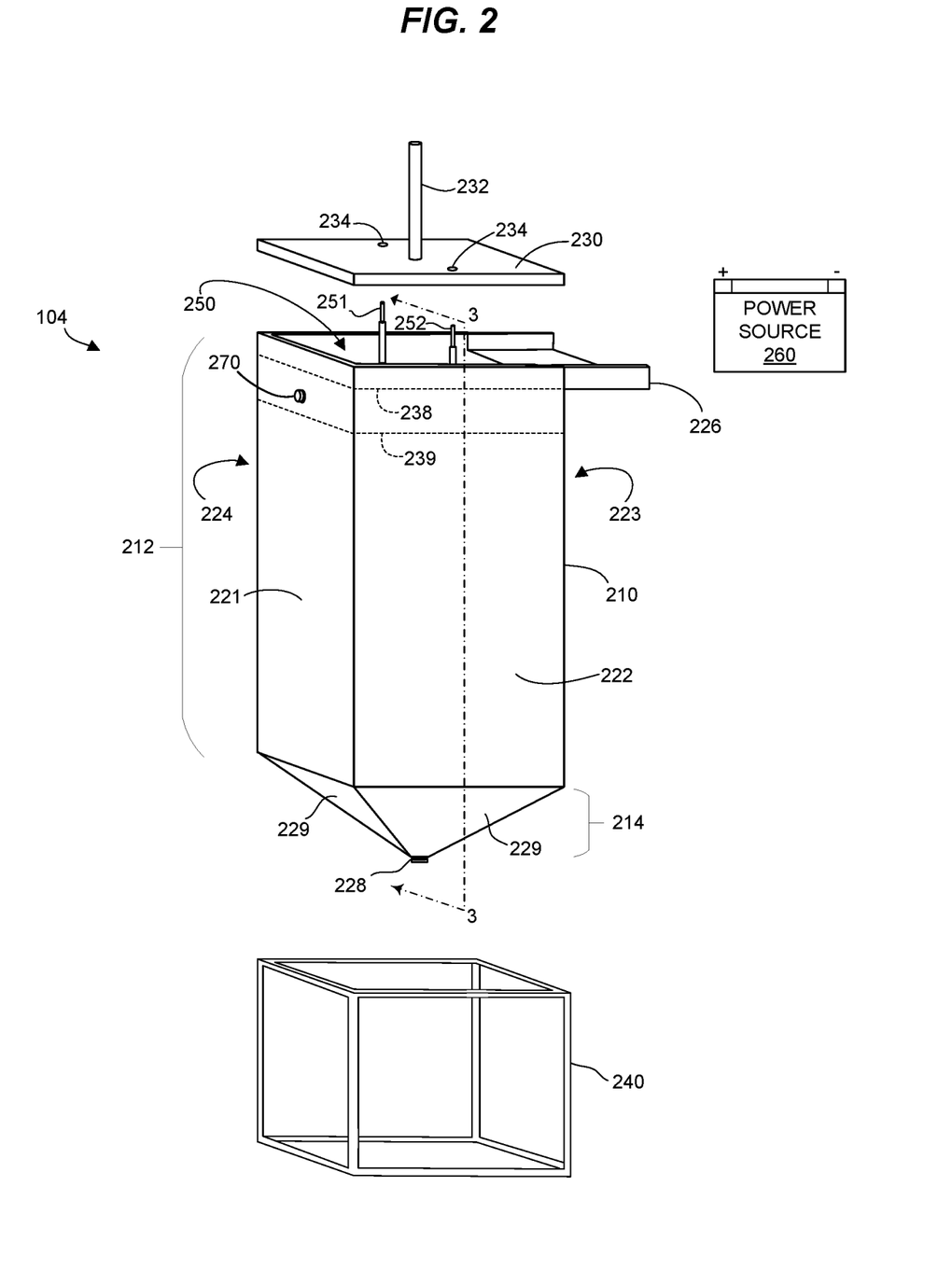
FIG. 2 is a perspective view of an EC unit in an illustrative embodiment.

FIG. 2 is a perspective view of EC unit 104 in an illustrative embodiment. Electrocoagulation is a technique used to treat wastewater to remove contaminants, such as ion particles, colloidal particles, etc. Contaminants are particles in wastewater that are generally held in the solution by electrical charges. Electrostatic repulsion of the particles inhibits the particles from coagulating in the wastewater. Electrocoagulation is a process that reduces the surface charges of the particles to a point where the particles are destabilized and can form an agglomeration. As will be described in more detail below, EC unit 104 includes an electrocoagulation reactor having a positively-charged electrode (an anode) and a negatively-charged electrode (a cathode) connected to an external power source. As wastewater flows through EC unit 104, a potential is placed across the electrodes by the power source, which injects a current through the wastewater. The positive side undergoes anodic reactions while the negative side undergoes cathodic reactions. Consumable metal plates, such as iron or aluminum, are usually used as sacrificial electrodes to continuously produce ions in the wastewater. The released ions neutralize the charges on the particles in the wastewater and thereby initiate coagulation. As a result, the reactive and excited state causes the contaminant particles to coagulate, and be released from the wastewater.

EC unit 104 includes a reaction tank 210 or tub, which is a receptacle or storage chamber configured to contain wastewater that is being processed. Reaction tank 210 includes an upper section 212 and a lower section 214 that are formed from a non-conductive material, such as Polyvinyl Chloride (PVC), polyethylene, polypropylene, or another type of plastic, fiberglass, etc. In this embodiment, upper section 212 is square or rectangular with side walls 221-224. Further in this embodiment, side walls 221-224 may generally be twice as tall as they are wide.

Lower section 214 tapers from upper section 212 to one or more ports 228 on the bottom of reaction tank 210 to form a funnel or hopper shape. Lower section 214 has one or more sloped walls 229 that join along a top edge to upper section 212, and converge at a bottom edge at or near port 228. Lower section 214 may be conical, wedge, pyramidal, or a combination of these shapes. The funnel shape of lower section 214 acts to concentrate liquid materials at port 228 when discharged from reaction tank 210. Port 228 is a mouth or opening at the bottom of reaction tank 210 that acts as an ingress and/or egress point for liquid materials.

When in operation, wastewater flows upward through EC unit 104 from port 228 and out of the top of reaction tank 210. Therefore, reaction tank 210 includes a trough 226 at its top. Trough 226 comprises an opening(s), channel, conduit, etc., at or near the top of reaction tank 210 that acts as an exit point for wastewater to flow out of EC unit 104. Trough 226 may have any desired structural design to convey wastewater out of EC unit 104 and to a settling tank 108 (see FIG. 1). Because trough 226 is the exit point for wastewater, the vertical position of trough 226 along side wall 223 defines a water level 238 for EC unit 104. Trough 226 is shown on side wall 223 in this embodiment, but may be on other side walls in other embodiments. Also, side wall 221 is shown with a recirculation port 270 through side wall 221 that is situated below the water level 238.

Although not visible in FIG. 2, EC unit 104 includes a series of plates (or blades) installed in the interior 250 of reaction tank 210 that are configured to conduct a current through wastewater that flows through reaction tank 210. The plates include a pair of charge plates that connect to a power source 260. One of the charge plates is a positively-charged electrode, and the other charge plate is a negatively-charged electrode. A plate conductor 251 for one of the charge plates, and a plate conductor 252 for the other charge plate are visible extending out of reaction tank 210. The plates also include one or more intermediate plates that are aligned between the charge plates within reaction tank 210, as will be described in more detail below. The top of one or more of the charge plates and the intermediate plates define an uppermost plate level 239, which is below water level 238. Recirculation port 270 is disposed between uppermost plate level 239 and water level 238.

EC unit 104 may further include a lid 230 that covers the top of reaction tank 210. During processing of wastewater, noxious gasses may be emitted from EC unit 104. Lid 230 acts to contain gas emissions from EC unit 104. Lid 230 may include a vent 232 that guides gases from the interior 250 of EC unit 104 to a more distant location. Lid 230 may further include plate conductor openings 234 that act as passageways for plate conductors 251-252 and insulators that surround plate conductors 251-252. Plate conductors 251-252 may therefore connect to a power source 260 outside of reaction tank 210. The power connection may be housed in a sealed chamber for safety of the operator and to protect the power connection from corrosion.

The EC unit 104 may further include a support framework 240 configured to hold reaction tank 210 in an upright position.

Figure 3:
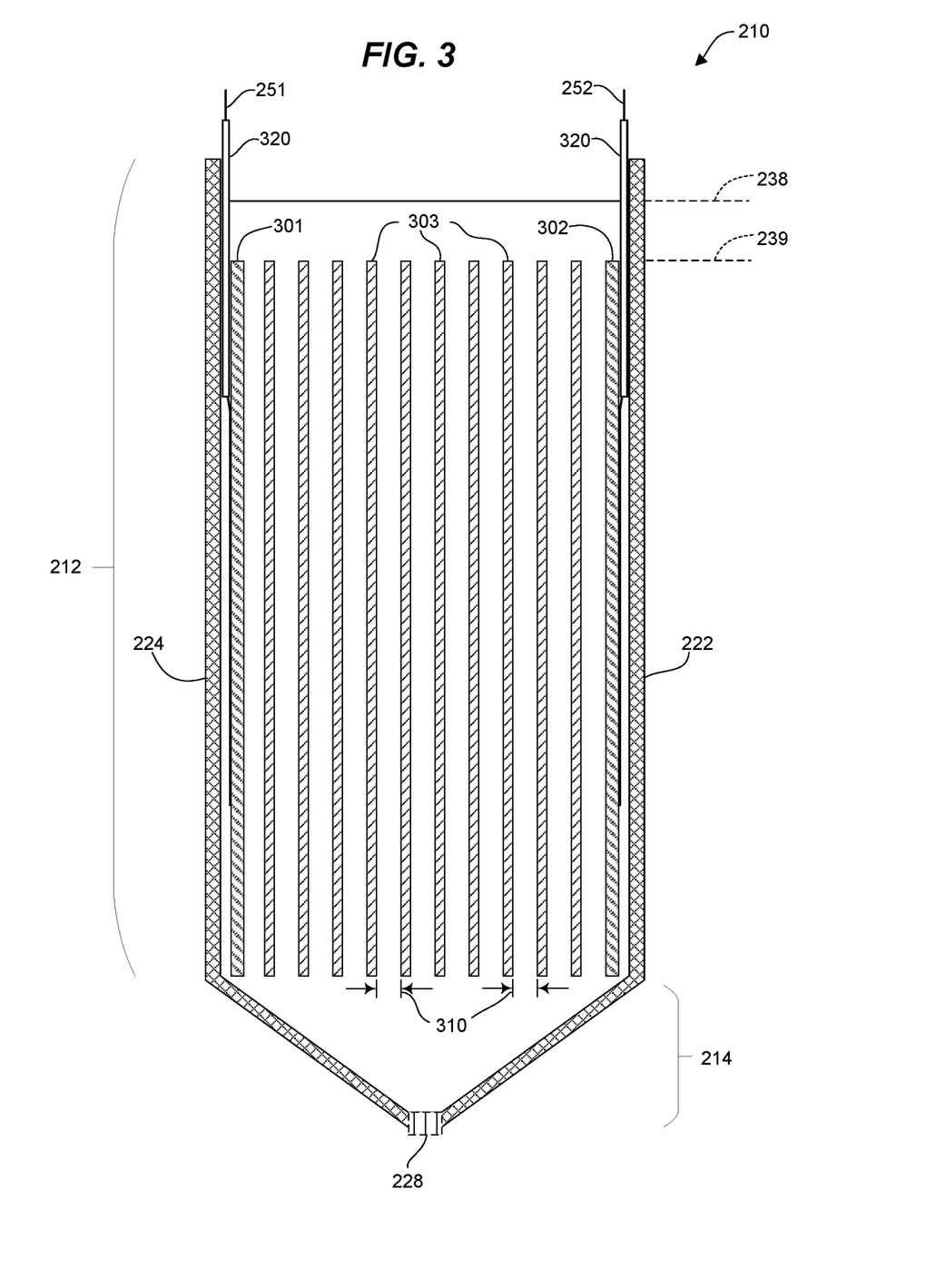
FIG. 3 is a cross-sectional view of a reaction tank in an illustrative embodiment.

FIG. 3 is a cross-sectional view of reaction tank 210 in an illustrative embodiment. The view in FIG. 3 is across cut-plane 3-3 in FIG. 2, and shows an electrocoagulation reactor having charge plates 301-302 that are spaced at a distance. A charge plate is a sheet of metallic material, such as iron, aluminum, etc. Charge plates 301-302 are disposed at or near opposite side walls of reaction tank 210 within upper section 212. Plate conductor 251 is configured to connect with one terminal of power source 260 (see FIG. 2), and plate conductor 252 is configured to connect with the other terminal of power source 260. An insulator 320 is disposed around plate conductors 251-252 from below water level 238 to above water level 238. Insulator 320 comprises any sleeve, sheath, covering, casing, coating, etc., made from a non-conductive material that is configured to electrically isolate at least a length of a plate conductor 251-252. Insulator 320 may extend from above water level 238 to an electrical coupling (e.g., a weld) between a charge plate 301-302 and a plate conductor 251-252.

The electrocoagulation reactor further includes one or more intermediate plates 303 or neutral plates disposed between charge plates 301-302. Intermediate plates 303 are not directly connected to power source 260. Intermediate plates 303 are spaced between charge plates 301-302 to improve current flow through the wastewater within reaction tank 210. In one embodiment, charge plates 301-302 may be oriented vertically and parallel to one another. Intermediate plates 303 may also be oriented vertically, and parallel to one another and to charge plates 301-302. Intermediate plates 303 are installed within reaction tank 210 so that there are gaps 310 between opposing faces of charge plates 301-302 and intermediate plates 303. For example, the gap 310 may be in the range of $\frac{1}{8}^{th}$ inch to $\frac{3}{8}^{th}$ inch, such as $\frac{5}{16}^{th}$ inch spacing between opposing faces. Gaps 310 form conduits for wastewater to flow upward between plates 301-303. It may be desirable for gap 310 to be substantially constant or uniform along the entire length and width of the plates to avoid physical contact between the plates. The tops of charge plates 301-302 and intermediate plates 303 may be co-planar, and the bottoms of charge plates 301-302 and intermediate plates 303 may be coplanar as shown in FIG. 3. The tops of charge plates 301-302 and intermediate plates 303 are positioned below water level 238 defined by trough 226. It may be desirable for the space between water level 238 and the tops of charge plates 301-302/intermediate plates 303 to be minimal to avoid a current path between charge plates 301-302 that traverses above intermediate plates 303. At the same time, the space between water level 238 and the tops of charge plates 301-302/intermediate plates 303 is large enough to accommodate recirculation port 270.

In other embodiments, charge plates 301-302 and intermediate plates 303 may be oriented at a slight angle relative to vertical, with a gap 310 between the plates.

In other embodiments, charge plates 301-302 and intermediate plates 303 may be staggered in the vertical direction so that the tops and bottoms of charge plates 301-302 and intermediate plates 303 are not coplanar.

Assume in an operational example that a potential is placed across plate conductors 251-252 by power source 260 with wastewater in reaction tank 210, where charge plate 301 acts as the anode (+) and charge plate 302 acts as the cathode (−). When this occurs, current is injected into plate conductor 251 and into charge plate 301. The current passes through the wastewater and intermediate plates 303, into charge plate 302, and along plate conductor 252. The current is therefore dispersed through the wastewater as the wastewater traverses upward through reaction tank 210, to neutralize charges on the particles in the wastewater.

Figure 4:
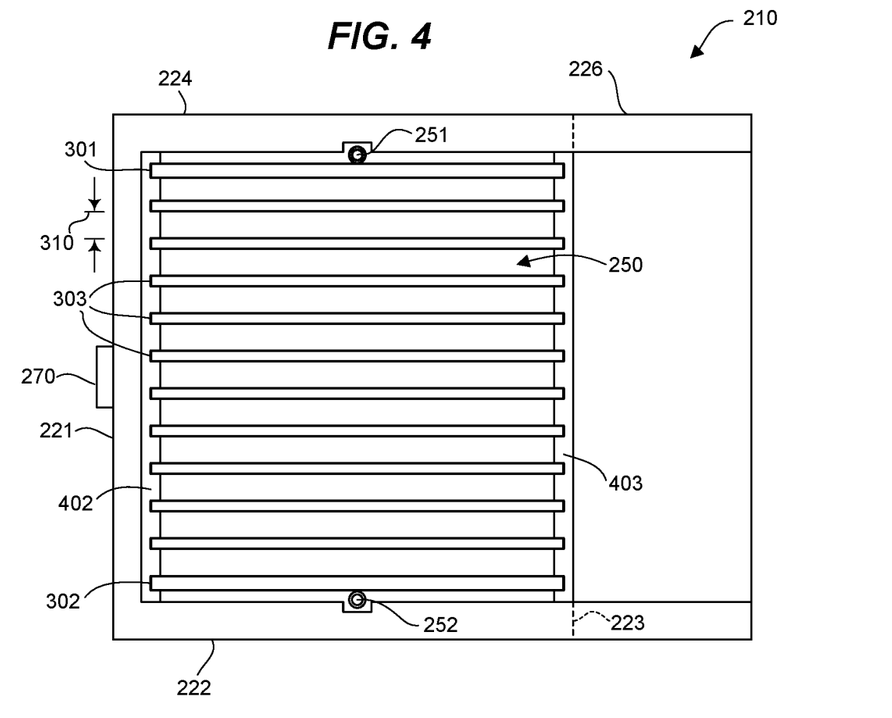
FIG. 4 is a top view of a reaction tank in an illustrative embodiment.

FIG. 4 is a top or plan view of reaction tank 210 in an illustrative embodiment. In this figure, lid 230 is removed to expose the interior 250 of reaction tank 210. Reaction tank 210 may include a mounting rack 402 disposed at or near side wall 221 of reaction tank 210, and a mounting rack 403 disposed at or near side wall 223 of reaction tank 210. Charge plate 301 is slid into mounting racks 402-403 proximate to side wall 224 of reaction tank 210, and charge plate 302 is slid into mounting racks 402-403 proximate to side wall 222 of reaction tank 210. Intermediate plates 303 are slid into mounting racks 402-403 between charge plates 301-302. In this view, charge plates 301-302 and intermediate plates 303 are oriented substantially vertical within reaction tank 210, with a gap 310 between the plates. FIG. 4 also shows trough 226 projecting outward from side wall 223 of reaction tank 210.

Figure 5:
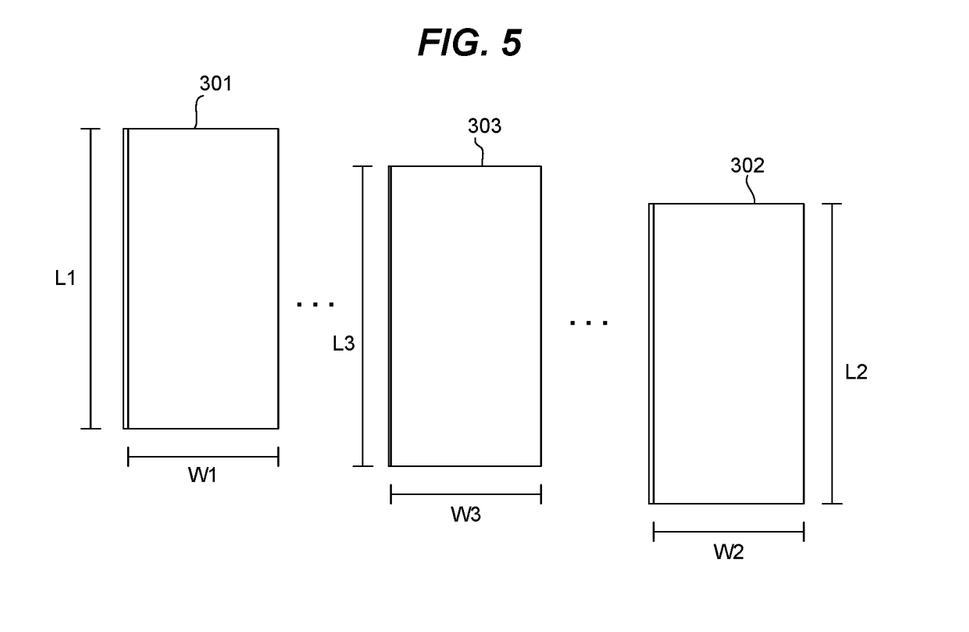
FIG. 5 is a perspective diagram of charge plates and intermediate plates in an illustrative embodiment.

FIG. 5 is a perspective view of charge plates 301-302 and intermediate plates 303 in an illustrative embodiment. In this embodiment, charge plates 301-302 and intermediate plates 303 are rectangular in shape. Charge plate 301 has a length L1 (or height) in the vertical direction, and a width W1 in the horizontal direction. Charge plate 302 has a length L2 in the vertical direction, and a width W2 in the horizontal direction. Intermediate plates 303 have a length L3 in the vertical direction, and a width W3 in the horizontal direction. The shape and/or area charge plates 301-302 may be the same or substantially the same, and the shape and/or area of intermediate plates 303 may be the same or substantially the same as charge plates 301-302.

In one embodiment, the length of the plates 301-303 may be at least twice the width of plates 301-303. As the wastewater flows upward through reaction tank 210, plates 301-303 that are longer than they are wide allows for longer residence or contact time between the wastewater and the electrical current. For example, the residence time may be about 90 seconds, which makes the electrocoagulation process more effective. Additionally or alternatively, charge plates 301-302 may be at least twice as thick as intermediate plates 303.

In other embodiments, plates 301-303 may have shapes that are non-rectangular. Also, the length and width of the plates 301-303 may differ as desired.

Figure 6:
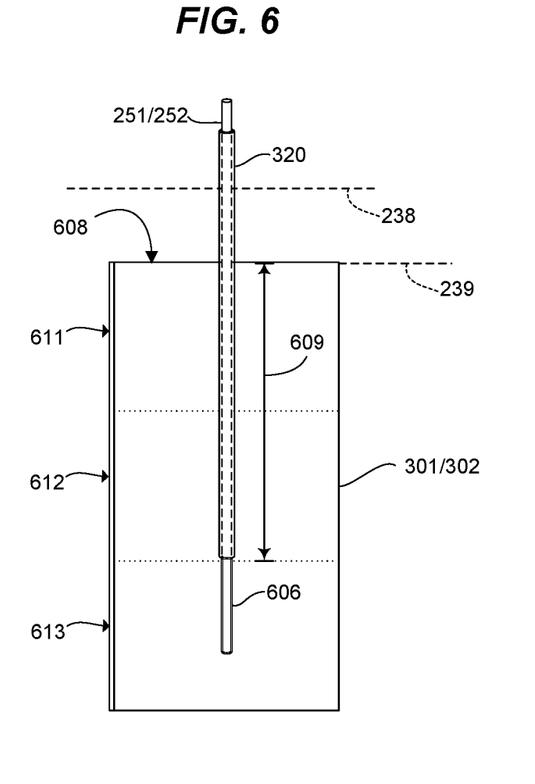
FIGS. 6-7 illustrate an electrical connection for a charge plate in an illustrative embodiment.
Figure 7:
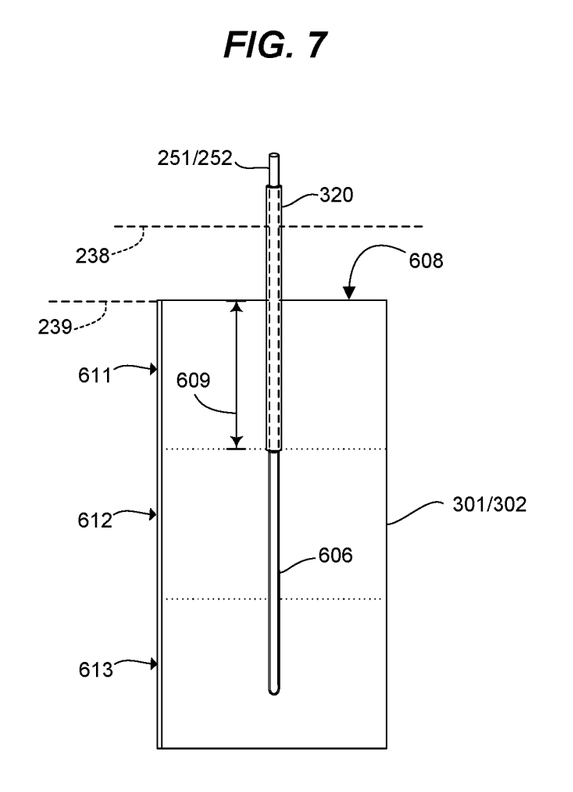

FIGS. 6-7 illustrate an electrical connection for a charge plate 301-302 in an illustrative embodiment. Charge plate 301/302 connects to power source 260 through a plate conductor 251/252 (see also, FIG. 2). Plate conductor 251/252 is a length of conductive material, such as a wire or rod (e.g., round or flat), that connects to charge plate 301/302 and extends out of reaction tank 210. Plate conductor 251/252 may be formed from the same material as charge plate 301/302. In FIG. 6, plate conductor 251/252 extends down along a side of charge plate 301/302, and makes an electrical connection with charge plate 301/302 at or near the bottom of charge plate 301/302 denoted by electrical coupling 606. Electrical coupling 606 represents a point where plate conductor 251/252 and charge plate 301/302 are joined. Electrical coupling 606 may comprise a weld or welded joint, a brazed joint, a fastened joint (e.g., bolts, screws, rivets, etc.), or another type of joint.

In the embodiments described herein, electrical coupling 606 is disposed a distance 609 from a top 608 of charge plate 301/302. In one embodiment, distance 609 may be at least three inches below a top 608 of charge plate 301/302 or a top of an intermediate plate 303 in the vertical direction. By moving electrical coupling 606 down from the top 608 of charge plate 301-302, current is injected toward the center or bottom of charge plate 301/302 and is not concentrated toward the top 608 of charge plate 301/302. The area of charge plate 301/302 may be divided into a top region 611, a middle region 612, and a bottom region 613. In the embodiment shown in FIG. 6, electrical coupling 606 of plate conductor 251/252 with charge plate 301/302 is located at bottom region 613. In the embodiment shown in FIG. 7, electrical coupling 606 of plate conductor 251/252 with charge plate 301/302 is located at middle region 612 and bottom region 613. In yet another embodiment, electrical coupling 606 of plate conductor 251/252 with charge plate 301/302 may be partially at top region 611, middle region 612, and/or bottom region 613.

Plate conductor 251/252 is wrapped, covered, or encased by insulator 320 from above water level 238 of EC unit 104 to electrical coupling 606. Insulator 320 may extend into or out of plate conductor openings 234 in lid 230 (see FIG. 2). Insulator 320 electrically isolates plate conductor 251/252 from charge plate 301/302 except along electrical coupling 606. Insulator 320 allows current to be injected into a charge plate 301-302 below the surface of the wastewater in reaction tank 210. Some benefits of injecting current below the surface of the wastewater are to mitigate or eliminate current spread across the top of intermediate plates 303, and to mitigate or eliminate deterioration of plate conductors 251-252 at the surface of the wastewater.

Figure 8:
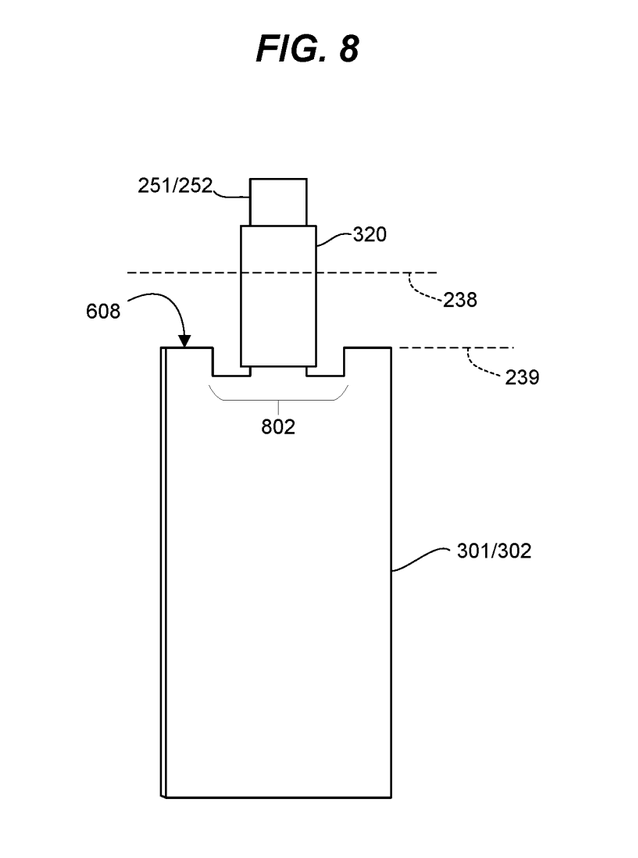
FIG. 8 is a perspective view of a charge plate in an illustrative embodiment.

FIG. 8 is a perspective view of a charge plate 301-302 in an illustrative embodiment. In this embodiment, a charge plate 301-302 and plate conductor 251-252 comprise a monolithic body formed, cast, stamped, etc., as a single piece. Charge plate 301-302 includes a recess 802 at the top 608 that extends downward. Plate conductor 251-252 projects out of top 608 of charge plate 301/302 from recess 802. Insulator 320 surrounds plate conductor 251-252 from below the top 608 of charge plate 301-302 to above the water level 238.

Figure 9:
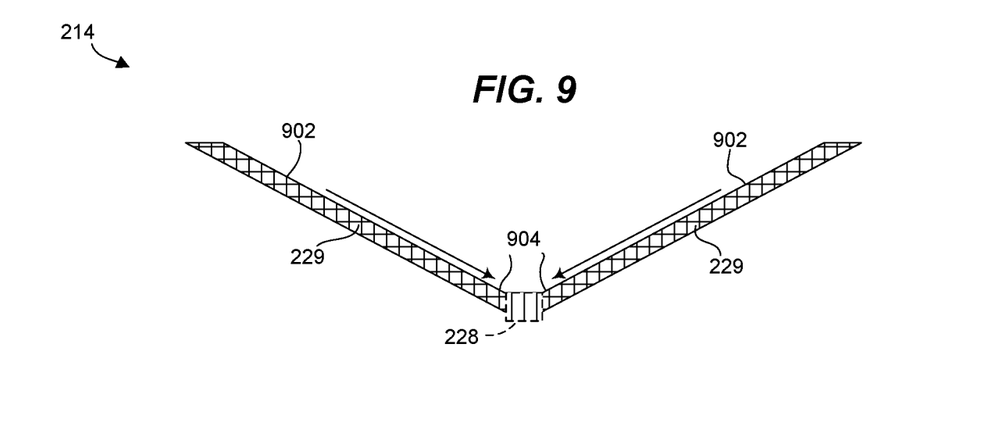
FIG. 9 is a cross-sectional view of a bottom section of a reaction tank in an illustrative embodiment.

FIG. 9 is a cross-sectional view of bottom section 214 of reaction tank 210 in an illustrative embodiment. As described above, side walls 229 of bottom section 214 converge at port 228 to form a funnel shape. Side walls 229 have interior surfaces 902 that slope toward and abut port 228 at a bottom end 904. In this embodiment, the bottom ends 904 of interior surfaces 902 are flush with port 228 to form a smooth transition between interior surfaces 902 and port 228. In other words, there is no lip or other protrusion between interior surfaces 902 and port 228. This is beneficial in that liquid material (e.g., wastewater, sludge, cleansing solution, etc.) is able to freely flow out of port 228 without obstruction so that reaction tank 210 can be completely drained. In an alternative embodiment, there may be more than one port 228 at the bottom of bottom section 214. For example, there may be one port 228 for wastewater, and a separate port for the cleansing solution.

Figure 10:
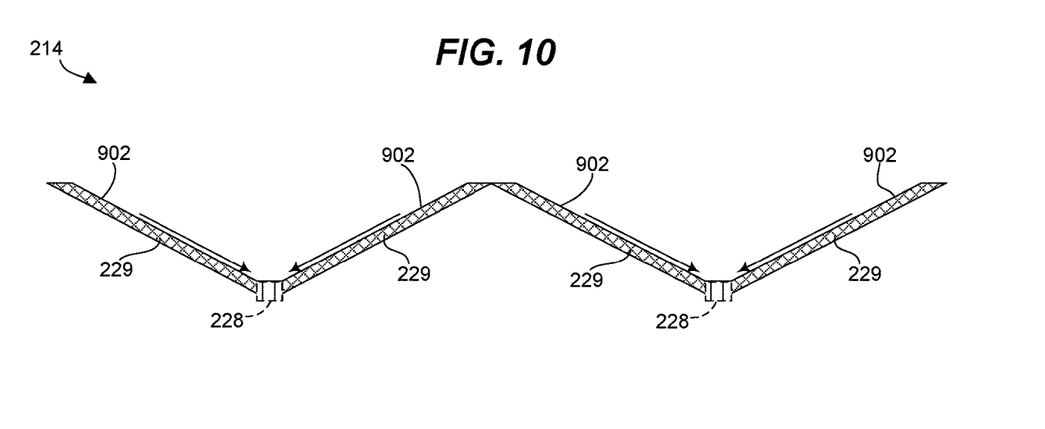
FIG. 10 is a cross-sectional view of a bottom section of a reaction tank in another illustrative embodiment.

In the embodiments shown above, reaction tank 210 has a single funnel structure that discharges at one or more ports 228. In other embodiments, reaction tank 210 may have multiple funnel structures that discharge at one or more ports 228. FIG. 10 is a cross-sectional view of bottom section 214 of reaction tank 210 in another illustrative embodiment. In this embodiment, bottom section 214 includes two funnel structures. The side walls 229 of bottom section 214 converge at two distinct ports 228. The embodiment in FIG. 10 is just one example, and bottom section 214 may have more than two funnel structures in other embodiments.

Figure 11:
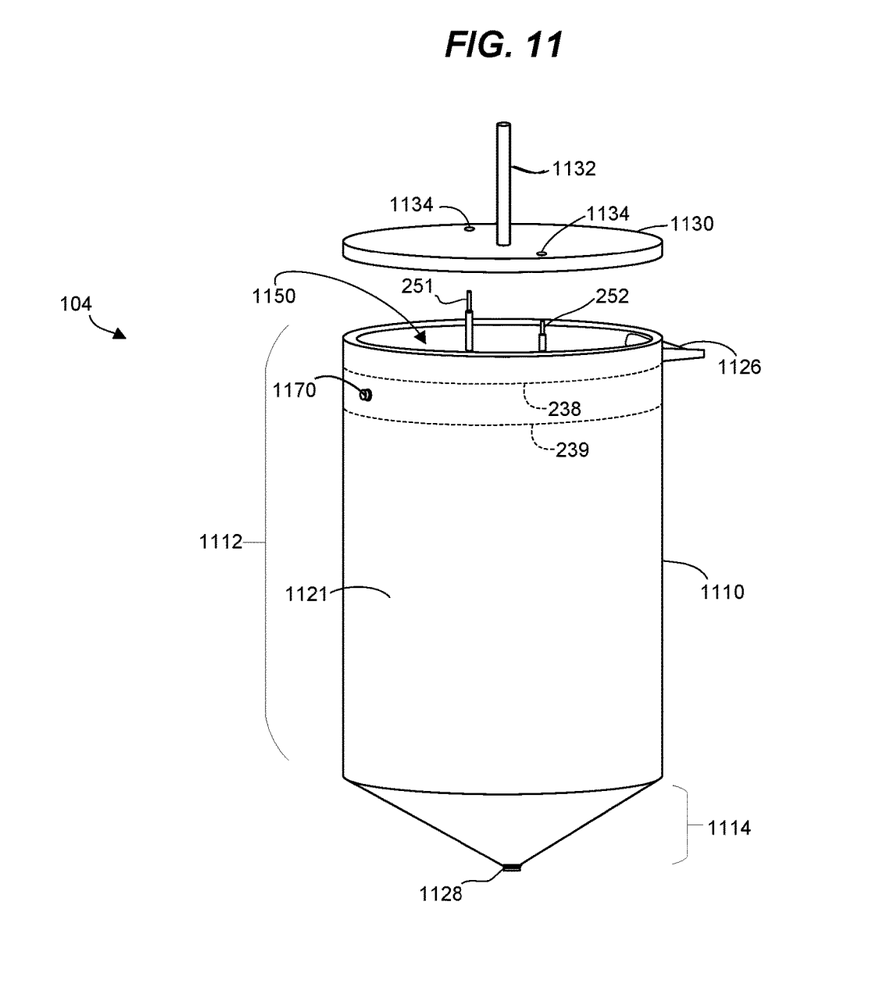
FIG. 11 is a perspective view of an EC unit with a cylindrical reaction tank in an illustrative embodiment.

The shape of reaction tank 210 for EC unit 104 shown in the above embodiments is square or rectangular. However, the reaction tank may have other shapes in other embodiments. FIG. 11 is a perspective view of an EC unit 104 with a cylindrical reaction tank in an illustrative embodiment. Reaction tank 1110 includes an upper section 1112 and a lower section 1114 that are formed from a non-conductive material. In this embodiment, upper section 1112 has a cylindrical side wall 1121. Lower section 1114 tapers from upper section 1112 to one or more ports 1128 on the bottom of reaction tank 1110 to form a funnel shape. Lower section 1114 has a conical shape that joins along a top edge to upper section 1112, and converges at a bottom edge at or near port 1128.

When in operation, wastewater flows upward through EC unit 104 from port 1128 and out of the top of reaction tank 1110. Therefore, reaction tank 1110 includes a trough 1126 at its top. Trough 1126 may have any desired structural design to convey wastewater out of EC unit 104 and to a settling tank 108 (see FIG. 1). Although not visible in FIG. 11, EC unit 104 includes a pair of charge plates installed in the interior 1150 of reaction tank 1110 that connect to a power source, and one or more intermediate plates that are aligned between the charge plates within reaction tank 1110. Trough 1126 is disposed above the top of the charge plates and the intermediate plates. Because trough 1126 is the exit point for wastewater, the vertical position of trough 1126 along side wall 1121 defines a water level 238 for EC unit 104. Also, side wall 1121 is shown with a recirculation port 1170 that is situated below the water level 238, and above the uppermost plate level 239.

EC unit 104 may further include a lid 1130 that covers the top of reaction tank 1110. Lid 1130 may include a vent 1132 that guides gases from the interior 1150 of EC unit 104 to a more distant location. Lid 1130 may further include plate conductor openings 1134 that act as passageways for plate conductors 251-252, and insulators that surround plate conductors 251-252.

Figure 12:
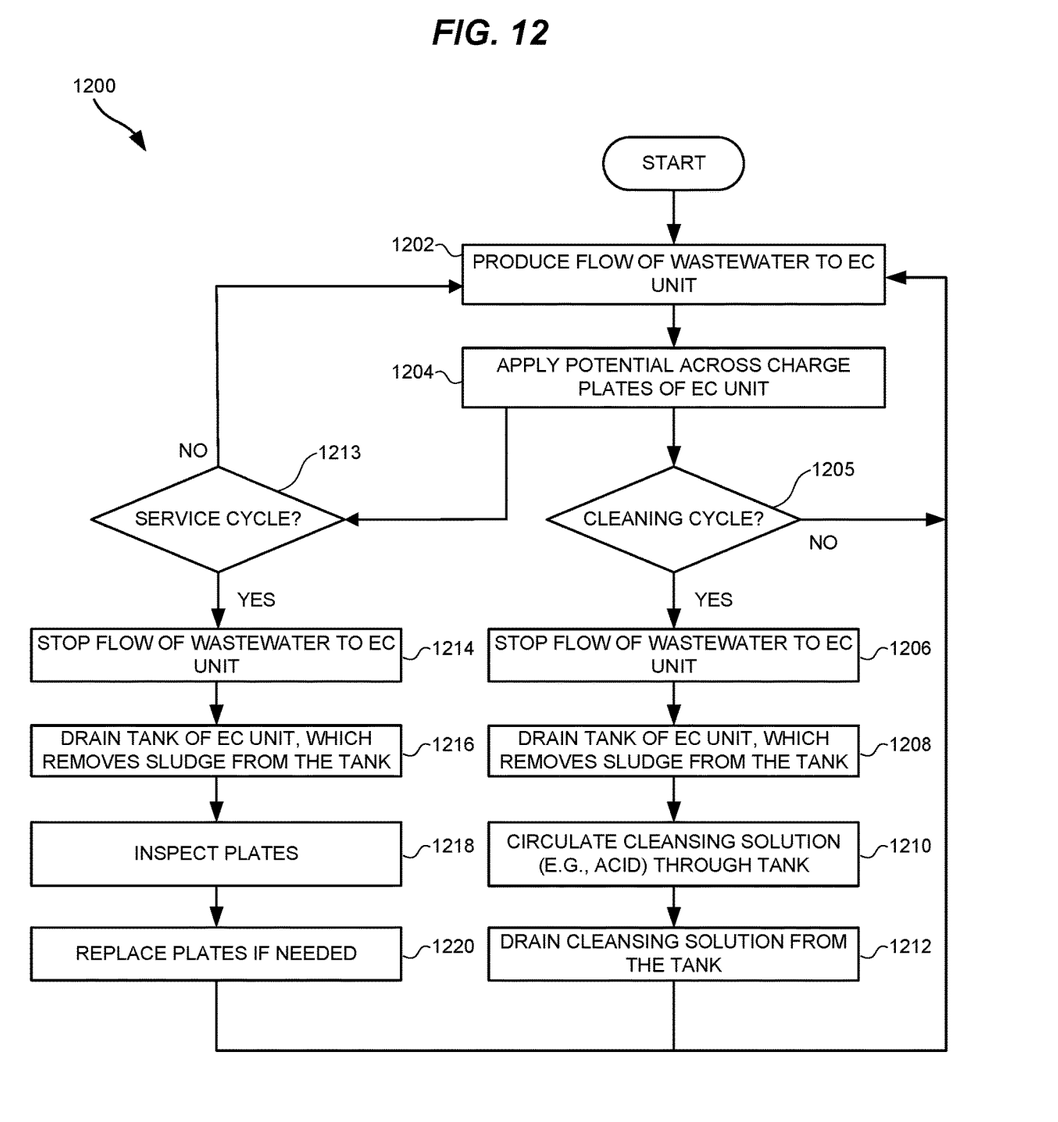
FIG. 12 is a flow chart illustrating a method of processing wastewater in an illustrative embodiment.

FIG. 12 is a flow chart illustrating a method 1200 of processing wastewater in an illustrative embodiment. The steps of method 1200 will be described with reference to water filtering system 100 in FIG. 1 and EC unit 104 in FIGS. 2-4, but those skilled in the art will appreciate that method 1200 may be performed in other systems or devices. Also, the steps of the flow charts described herein are not all inclusive and may include other steps not shown, and the steps may be performed in an alternative order.

When in operation, controller 109 produces a flow of wastewater from inlet tank 102 to one or more EC units 104 (step 1202). There may be multiple EC units 104 operating in parallel based on the flow requirements of water filtering system 100. Thus, controller 109 selects which of the EC units 104 are active at any point in time, and produces a flow of wastewater to the selected EC unit(s) 104. To supply wastewater to an EC unit 104, controller 109 opens valve 124 and activates pump 122 to produce a flow of wastewater along inlet fluid path 120 to EC unit 104. Controller 109 controls power source 260 to apply a potential across charge plates 301-302 of EC unit 104 (step 1204). As EC unit 104 receives the flow of wastewater from its bottom, the wastewater flows upward within reaction tank 210 between the charge plates 301-302 and intermediate plates 303. As the wastewater flows between the charge plates 301-302 and intermediate plates 303, the potential placed across the charge plates 301-302 injects a current through the wastewater. The positive charge plate 301/302 undergoes anodic reactions while the negative charge plate 301/302 undergoes cathodic reactions, which continuously produces ions in the wastewater. The released ions neutralize the charges on the particles in the wastewater and thereby initiate coagulation. Controller 109 may control power source 260 to reverse polarity across charge plates 301-302 periodically (e.g., every 20 seconds) to avoid oxidation or scaling on one side of charge plates 301-302 and intermediate plates 303. Controller 109 may also adjust the potential placed across charge plates 301-302 based on condition of the wastewater, condition of plates 301-303, or other factors.

The wastewater flows out trough 226 at the top of reaction tank 210, and is gravity-fed into settling tank 108 along outlet fluid path 160 where the wastewater is temporarily stored. As the wastewater sits in settling tank 108, the neutralized particles in the wastewater separate from the wastewater and fall to the bottom of settling tank 108. The particles that are released from the wastewater form a slurry of solids on the bottom of settling tank 108, while the filtered water remains as a liquid on top of the slurry. The filtered water may be released from settling tank 108 via outlet path 170.

Controller 109 determines whether to initiate a cleaning cycle for an EC unit 104 (step 1205). Charge plates 301-302 and intermediate plates 303 may become coated with a non-conducting oxide, which may cause the electrocoagulation process to fail through reduced efficiency and increased power consumption. The cleaning cycle may be performed periodically (e.g., after 20-90 minutes of runtime) to remove the oxide or scaling that forms on the plates 301-303 of the EC unit 104. If multiple EC units 104 are running in parallel, controller 109 may select one or more EC units 104 for a cleaning cycle while other EC units 104 stay in operation.

When a cleaning cycle is initiated for an EC unit 104, controller 109 stops the flow of wastewater to the selected EC unit 104 (step 1206). To do so, controller 109 deactivates pump 122 and closes valve 124 to stop the flow of wastewater along inlet fluid path 120. Controller 109 then drains reaction tank 210 of EC unit 104 (step 1208). To drain reaction tank 210, controller 109 opens valve 132 and the liquid remaining in reaction tank 210 discharges along drain fluid path 130 to inlet tank 102. The liquid remaining in reaction tank 210 is generally a slurry comprised of wastewater and a sludge that forms in the bottom section 214 of reaction tank 210. Due to the funnel shape of bottom section 214 of reaction tank 210, the slurry is able to fully evacuate from reaction tank 210 along drain fluid path 130, including any sludge that forms in reaction tank 210. Thus, an operator does not need to remove lid 230 and scrape the sludge from reaction tank 210.

With reaction tank 210 emptied, controller 109 closes valve 132. Controller 109 then circulates a cleansing solution through reaction tank 210 (step 1210). To do so, controller 109 opens valves 124 and 156, and activates pump 142 to produce a flow of cleansing solution along inlet fluid path 140 to EC unit 104. As EC unit 104 receives the flow of cleansing solution from its bottom, the cleansing solution flows upward within reaction tank 210 between the charge plates 301-302 and intermediate plates 303. The cleansing solution then flows out of recirculation port 270 (see FIG. 2) along recirculation fluid path 158 back to cleansing tank 106. Recirculation port 270 is situated between water level 238 and the tops of plates 301-303 (i.e., the uppermost plate level 239 in FIG. 2) so that the cleansing solution does not flow out of trough 226 and into settling tank 108. At the same time, recirculation port 270 is situated above the uppermost plate level 239 so that the tops of plates 301-303 are exposed to the cleansing solution. The cleansing solution acts to remove oxide or scaling on charge plates 301-302 and intermediate plates 303. The cleansing solution may be circulated for a time period (e.g., 5-10 minutes), and the cleansing solution may be allowed to sit in reaction tank 210 for a time period (e.g., 90 seconds) by deactivating pump 142 and closing valves 124 and 156. At the end of the cleaning cycle, controller 109 drains the cleansing solution from reaction tank 210 (step 1212). To do so, controller 109 opens valve 152 and the cleansing solution in reaction tank 210 discharges along drain fluid path 150 back to cleansing tank 106. After the cleaning cycle, controller 109 may put EC unit 104 back into operation.

Controller 109 may also determine whether to initiate a service cycle for an EC unit 104 (step 1213). As stated above, charge plates 301-302 and intermediate plates 303 may be coated with a non-conducting oxide, which may cause the electrocoagulation process to fail through reduced efficiency and increased power consumption. Also, charge plates 301-302 and intermediate plates 303 are sacrificial and will corrode during the electrocoagulation process. The service cycle is performed to determine whether one or more of the charge plates 301-302 and intermediate plates 303 need to be serviced or replaced. If multiple EC units 104 are running in parallel, controller 109 may select one or more EC units 104 for a service cycle while other EC units 104 stay in operation.

When a service cycle is initiated for an EC unit 104, controller 109 stops the flow of wastewater to the selected EC unit 104 (step 1214). To do so, controller 109 deactivates pump 122 and closes valve 124 to stop the flow of wastewater along inlet fluid path 120. Controller 109 then drains reaction tank 210 of EC unit 104 (step 1216). To drain reaction tank 210, controller 109 opens valve 132 and the liquid remaining in reaction tank 210 discharges along drain fluid path 130 to inlet tank 102.

With reaction tank 210 emptied, controller 109 may control a sensor (not shown) or another type of element to inspect charge plates 301-302 and intermediate plates 303 (step 1218). Alternatively, an operator may remove lid 230 to visually inspect charge plates 301-302 and intermediate plates 303. One or more of charge plates 301-302 and intermediate plates 303 may be replaced (step 1220) as needed. After the service cycle, controller 109 may put EC unit 104 back into operation.

Although specific embodiments were described herein, the scope of the disclosure is not limited to those specific embodiments. The scope of the disclosure is defined by the following claims and any equivalents thereof

What is claimed is:
1. A system comprising:
an Electrocoagulation (EC) unit comprising:
a reaction tank formed from a non-conductive material;
charge plates within the reaction tank that are spaced at a distance and oriented substantially vertical;
intermediate plates disposed within the reaction tank between the charge plates and oriented substantially vertical;
conductors configured to electrically couple the charge plates to a power source, wherein a conductor of the conductors makes an electrical connection with a charge plate at an electrical coupling disposed a distance below a top of the charge plate, and extends out of a top of the reaction tank; and
insulators that encase the conductors, wherein an insulator of the insulators encases the conductor from the electrical coupling below the top of the charge plate to above a water level of the EC unit.

2. The system of claim 1 wherein:
for each charge plate of the charge plates, a length of the charge plate in a vertical direction is at least twice a width of the charge plate in a horizontal direction.

3. The system of claim 2 wherein:
for each intermediate plate of the intermediate plates, a length of the intermediate plate in the vertical direction is at least twice a width of the intermediate plate in the horizontal direction.

4. The system of claim 1 wherein:
the charge plates are at least twice as thick as the intermediate plates.

5. The system of claim 1 wherein the EC unit further comprises:
gaps between the charge plates and the intermediate plates;
wherein the gaps are in the range of $\frac{1}{8}^{th}$ inch to $\frac{3}{8}^{th}$ inch.

6. The system of claim 1 wherein:
each of the conductors comprises a rod formed from a same conductive material as the charge plates.

7. The system of claim 1 wherein the EC unit further comprises:
a lid configured to cover the top of the reaction tank;
wherein the lid includes conductor openings that act as passageways for the conductors and the insulators.

8. The system of claim 1 wherein:
an area of each of the charge plates is divided into a top region, a middle region, and a bottom region; and the electrical coupling between the charge plate and the conductor is located at the bottom region of the charge plate with the conductor extending out of the top of the reaction tank and the insulator electrically isolating the conductor from the charge plate except along the electrical coupling.

9. The system of claim 8 wherein:
the electrical coupling between the charge plate and the conductor is located at the bottom region and the middle region of the charge plate.

10. The system of claim 1 wherein:
the electrical coupling comprises a weld between the charge plate and the conductor.

11. The system of claim 1 wherein:
a bottom section of the reaction tank tapers toward at least one bottom port disposed at a bottom of the reaction tank; and
interior surfaces of the bottom section of the reaction tank slope toward and abut the at least one bottom port, and are flush with the at least one bottom port.

12. The system of claim 1 wherein the reaction tank further comprises:
a recirculation port through a side wall of the reaction tank;
wherein the recirculation port is between the water level of the EC unit and an uppermost plate level of the charge plates and the intermediate plates.

13. The system of claim 1 wherein:
the insulator electrically isolates the conductor from the charge plate except along the electrical coupling.

14. A system comprising:
an Electrocoagulation (EC) unit comprising:
  a reaction tank formed from a non-conductive material, the reaction tank comprising:
    an upper section comprising at least one side wall;
    a lower section that tapers from the upper section to at least one bottom port disposed at a bottom of the reaction tank to form a funnel shape, wherein the at least one bottom port acts as an ingress point for a flow of wastewater into the reaction tank; and
    a trough configured as an exit for the flow of wastewater that flows up from the bottom of the reaction tank;
  charge plates within the reaction tank that are spaced at a distance and oriented substantially vertical;
  intermediate plates disposed within the reaction tank between the charge plates and oriented substantially vertical;
  conductors configured to electrically couple the charge plates to a power source that applies a potential across the charge plates as the wastewater flows upward within the reaction tank between the charge plates and intermediate plates during a processing operation of the wastewater, wherein a conductor of the conductors makes an electrical connection with a charge plate at an electrical coupling disposed a distance below a top of the charge plate, and extends out of a top of the reaction tank; and
  insulators that encase the conductors, wherein an insulator of the insulators encases the conductor from the electrical coupling below the top of the charge plate to above a water level of the EC unit;
  wherein interior surfaces of the lower section of the reaction tank slope toward and abut the at least one bottom port, and are flush with the at least one bottom port.

15. The system of claim 14 wherein:
during a cleaning cycle, the at least one bottom port acts as an egress point for a slurry of the wastewater and a sludge that forms in the lower section of the reaction tank.

16. The system of claim 15 wherein the EC unit further comprises:
a recirculation port through the at least one side wall of the reaction tank, and disposed below the water level of the EC unit defined by a vertical position of the trough along the at least one side wall and above an uppermost plate level of the charge plates and the intermediate plates;
wherein during the cleaning cycle:
  the at least one bottom port acts as an ingress point for a cleansing solution; and
  the recirculation port comprises an exit for the cleansing solution that flows up from the bottom of the reaction tank.

17. The system of claim 14 wherein:
the lower section of the reaction tank has a conical shape.

18. A system comprising:
an Electrocoagulation (EC) unit comprising:
  a reaction tank having an upper section and a lower section formed from a non-conductive material;
  charge plates spaced at a distance within the upper section and oriented substantially vertical;
  intermediate plates disposed between the charge plates within the upper section and oriented substantially vertical; and
  conductors configured to electrically couple the charge plates to a power source;
  wherein an individual charge plate of the charge plates, and an individual conductor of the conductors comprise a monolithic body;
  wherein the individual charge plate includes a recess at a top of the individual charge plate that extends downward from the top of the individual charge plate, and the individual conductor projects out of the top of the individual charge plate from the recess;
  wherein the EC unit further comprises insulators that encase the conductors, wherein an insulator of the insulators encases the individual conductor from the recess below the top of the individual charge plate to above a water level of the EC unit.

19. The system of claim 18 wherein:
the lower section of the reaction tank tapers from the upper section to at least one bottom port disposed at a bottom of the reaction tank to form a funnel shape; and
interior surfaces of the lower section of the reaction tank slope toward and abut the at least one bottom port, and are flush with the at least one bottom port.

20. The system of claim 19 wherein:
the at least one bottom port acts as an ingress and egress point for liquid materials.

* * * * *